United States Patent
Chen et al.

(10) Patent No.: US 9,118,190 B2
(45) Date of Patent: Aug. 25, 2015

(54) CHARGING BALANCING SYSTEM BASED ON BATTERY OPERATING PROCESS AND METHOD THEREOF

(71) Applicants: Sheng-Wei Chen, Kaohsiung (TW); Kuan-Yuen Liao, Kaohsiung (TW); Wen-Jiun Liu, Kaohsiung (TW); Jeng-Chyan Lin, Kaohsiung (TW)

(72) Inventors: Sheng-Wei Chen, Kaohsiung (TW); Kuan-Yuen Liao, Kaohsiung (TW); Wen-Jiun Liu, Kaohsiung (TW); Jeng-Chyan Lin, Kaohsiung (TW)

(73) Assignee: Metal Industries Research & Development Centre, Kaohsiung (TW)

( * ) Notice: Subject to any disclaimer, the term of this patent is extended or adjusted under 35 U.S.C. 154(b) by 154 days.

(21) Appl. No.: 14/067,943

(22) Filed: Oct. 30, 2013

(65) Prior Publication Data

US 2015/0115892 A1  Apr. 30, 2015

(51) Int. Cl.
*H02J 7/00* (2006.01)

(52) U.S. Cl.
CPC .............. *H02J 7/0014* (2013.01); *H02J 7/0022* (2013.01)

(58) Field of Classification Search
CPC .............................. H02J 7/0014; H02J 7/0022
See application file for complete search history.

(56) References Cited

U.S. PATENT DOCUMENTS

| | | | |
|---|---|---|---|
| 6,876,175 B2 * | 4/2005 | Schoch | 320/132 |
| 7,193,391 B2 * | 3/2007 | Moore | 320/116 |
| 7,723,958 B2 * | 5/2010 | Darilek | 320/132 |
| 8,163,410 B2 * | 4/2012 | Fulop et al. | 429/61 |
| 8,198,864 B2 * | 6/2012 | Koch et al. | 320/132 |
| 8,274,291 B2 * | 9/2012 | Tsuchiya | 324/426 |
| 8,614,563 B2 * | 12/2013 | Baughman | 320/118 |
| 8,970,178 B2 * | 3/2015 | Berkowitz et al. | 320/139 |
| 2014/0095090 A1 * | 4/2014 | Chen et al. | 702/63 |
| 2014/0244193 A1 * | 8/2014 | Balasingam et al. | 702/63 |

* cited by examiner

*Primary Examiner* — Naum B Levin
(74) *Attorney, Agent, or Firm* — Chih Feng Yeh; Huntington IP Consulting Co., Ltd.

(57) ABSTRACT

A charging balancing system and method thereof based on a battery operating process and are disclosed. This is done by detecting a state of all cells in a detecting battery assembly to generate detection parameters, analyzing the detection parameters to produce an operating process, selecting at least one of residual power estimation methods according to the operating process, so as to calculate a residual power of each cell, and adjusting the charging current and charging time for each cell according to the residual power. As such, the efficiency of charging balancing is promoted.

11 Claims, 7 Drawing Sheets

CHARGING BALANCING SYSTEM BASED ON BATTERY OPERATING PROCESS AND METHOD THEREOF

BACKGROUND OF RELATED ART

1. Field of Invention

The present invention is related to a battery charging balancing system and a method thereof. Particularly, the present invention is related to a battery charging balancing system and a method thereof based on a battery operation process thereof by selecting a state of charge (SOC) estimation method according to the battery operation process.

2. Related Art

Recently, as prevalence and vigorous development of mobile devices, it has been very common to use battery charging balancing technique for increasing lifetime of a secondary battery. Hence, it is quite an issue to promote the battery charging balancing efficiency for the relevant product fields.

Generally, the charging balancing technique includes two main parts, i.e. active balancing and passive balancing. To effectively promote the charging balancing efficiency, it is a general measure to estimate a residual amount of the cell as a reference for charging balancing control. Hence, the charging balancing efficiency is greatly affected by the SOC of the battery. If the SOC of the battery cannot be accurately estimated, the cells in the battery assembly may not be effectively subject to the charging balancing, results in an overly charging issue of the cells due to the poor charging efficiency. This may even causes a reduction of the lifetime of the secondary battery.

In view of this, some factories have proposed ways to estimate the SOC for various batteries, such as the open circuit voltage method, ampere-hour method, Coulomb counting method, Carmen wave filtering method. There are even some methods proposed to improve the above methods for more accurate estimation, such as the improved Coulomb counting method derived from the Coulomb counting method. However, the estimation methods previously applied on such secondary battery might not be still suitable to the battery after various operations process. For example, after a long use of the secondary battery, the ampere-hour method for estimation of the SOC may get distorted with the use time of the battery. Therefore, the SOC estimation methods and the improved versions thereof still have the issue of poor charging balancing caused from the inaccurate estimation of the SOC, and need to be well addressed.

In view of the above, there is a need to overcome the long existing issue of poor charging balancing caused from the inaccurate estimation of the SOC, by setting forth an effective technique.

SUMMARY

In view of the drawback existing in the prior art, the present invention discloses a charging balancing system based on a battery operating process and a method thereof.

The charging balancing system based on a battery operating process applied onto a battery assembly having a plurality of cells according to the present invention comprises a storing module, pre-storing a plurality of state of charge (SOC) estimation methods; a detecting module, continuously detecting and recording a state of each of the plurality of cells to generate a set of detection parameters, respectively; a microprocessing unit, analyzing the set of parameters to produce an operating process, selecting at least one of the plurality of SOC estimation methods from the storing module to calculate a SOC of the respective cells according to the operating process; and a charging balancing module, adjusting a charging current and a charging time of the respective cells according to the calculated SOC of the respective cells to enable the respective cells to maintain charging balanced.

The charging balancing method based on a battery operating process applied onto a battery assembly having a plurality of cells according to the present invention comprises steps of pre-storing a plurality of SOC estimation methods; continuously detecting and recording a state of each of the plurality of cells to generate a set of detection parameters, respectively; analyzing the set of parameters to produce an operating process, selecting at least one of the plurality of state of charge estimation methods to calculate a SOC of the respective cells according to the operating process, respectively; and adjusting a charging current and a charging time of the respective cells according to the calculated SOC of the respective cell to enable the respective cells to maintain balanced, respectively.

The system and method disclosed in the present invention are summarized as the above, which have the differences as compared to the prior art, including detection of the state of each of the plurality of cells in the battery assembly to generate the plurality of detection parameters, analysis of the set of parameters to produce the operating process, selection of at least one of the plurality of SOC estimation methods to calculate the SOC of the respective cells according to the operating process, respectively; and adjustment of the charging current and the charging time of the respective cells according to the calculated SOC of the respective cells to enable the respective cells to maintain balanced, respectively, whereby solve the issues encountered in the prior art.

By means of the technical mechanism, the present invention can also achieve in a good charging balancing efficiency of a battery.

BRIEF DESCRIPTION OF THE DRAWINGS

The invention will become more fully understood from the detailed description given herein below illustration only, and thus is not limitative of the present invention, and wherein.

DETAILED DESCRIPTION

In the following, the context is given to describe the present invention in details in connection with the annex drawings and the embodiments with respect to the features and implementations thereof, which is sufficient to enable those who skilled in the art readily to realize the technical mechanism intent to solve the technical problems and implement the same, so as to achieve in the efficacy exclaimed in the present invention.

Before the description for a charging balancing system based on a battery operating process and a method thereof, technical nouns defined privately in this application will be explained first. In this application, the noun "operating process" related to information of a cell means "a use state of the cell", which includes "charging/discharging number", "discharging depth", "temperature variation", and so on. Since different users have different operation parameters on the respective battery assemblies, such as use way, place, time, and the like, the operating processes of the different battery assemblies are also different.

Further, this operating process may be generated by continuously detecting and recording the state of the cell. In addition, the dynamic battery inner-resistance point is deduced based on a variation of an inner-resistance of the cell (the inner-resistance of the cell will vary with a voltage variation of the battery when being charged and discharged, e.g. the inner-resistance increases with an electric capacity within the cell when the cell is charged and discharged). According to the dynamic battery inner-resistance point, a corresponding capacity may be obtained when a look-up table is available at the same time. Further, a component of the dynamic battery inner-resistance electric capacity may be generated, as will be described in more detail with a drawing accompanied.

In real implementation, a formula of the dynamic battery inner-resistance point may be "(reference voltage−close circuit voltage value)*α/(reference voltage+β*close circuit voltage value)", in which "α" is an amplification parameter and "β" is a parameter related to the type and in-series number of the cell. In the calculation, the detected voltage value is continuously taken as a close circuit voltage value, to deduce the dynamic battery inner-resistance point, in which an effect brought from the current factor may be eliminated.

Figure 1:
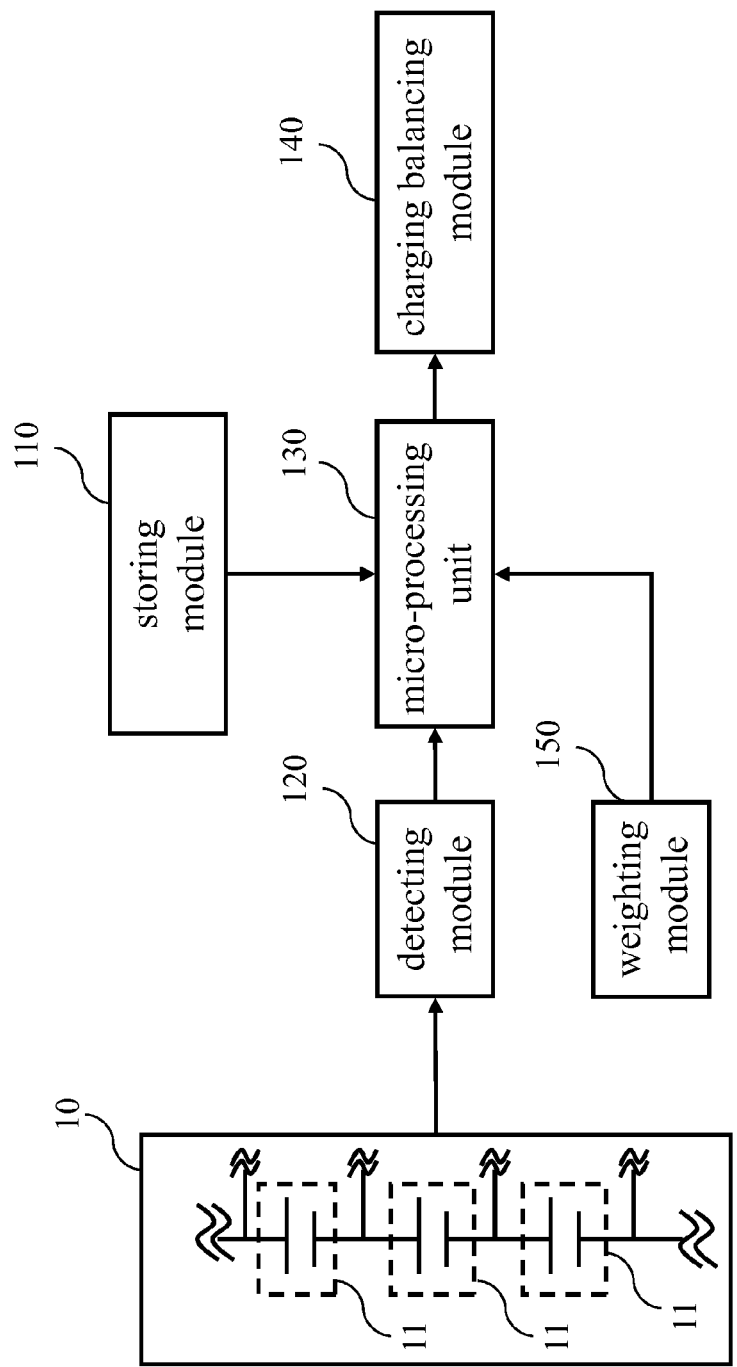
FIG. 1 is a block diagram depicting a charging balancing system based on a battery operating process according to the present invention.

In what follows, drawings are presented for further describing the charging balancing system and method based on the battery operating process. Referring to FIG. 1, which is a block diagram depicting the charging balancing system based on a battery operating process according to the present invention. The charging balancing system is applied on a cell 10 having a plurality of cells 11, and comprises a storing module 110, a detecting module 120, a micro-processing 130, and a charging balancing module 140. The storing module 110 is used to pre-store several state of charge (SOC) estimation methods, including the ampere-hours method, Coulomb counting method, inner-resistance method, and voltage look-up table method, and so on, which have been employed in the prior art. Alternatively, a SOC designed by the inventor of this application, such as vector SOC estimation method, which will be described in more detail with presence of the drawing associated therewith. In addition, the storing module 110 also pre-stores various kinds of parameters and messages required by these SOC estimation methods. For example, in the case that the stored SOC estimation method is the voltage look-up table method, a look-up table describing a relationship between voltage and electric capacity is simultaneously stored. In real implementation, the storing module 110 may be in the form of read-only memory (ROM), electrically erasable programmable read-only memory (EEPROM) or flash ROM.

The detecting module 120 is used to continuously detecting and recording a state of each of the plurality of cells to generate a set of detection parameters, respectively. The set of detection parameters is selected from a group consisting of a close circuit voltage value, a close circuit current value, a discharging current amount, a temperature, a charging/discharging number, and a discharging depth of the respective cell. For example, a voltage detector may be used to detect the close circuit voltage value of the cell, a current detector may be used to detect the close circuit current value of the cell and the discharging current amount, and a detector may be used to detect the temperature value of the cell. And these detected values are used as the mentioned set of detection parameters. In addition, by means of continuous detection, the charging/discharging number, discharging depth and the like may also be obtained. In real implementation, the detection parameters may be recorded in an electrically erasable programmable read-only memory (EEPROM) or a flash ROM.

The micro-processing unit 130 is used to analyze the set of parameters to produce an operating process. Further, the micro-processing unit 130 also selects at least one of the plurality of SOC estimation methods from the storing module 110 to calculate a SOC of each of the cells 11 according to the operating process, respectively. For example, the micro-processing unit 130 may analyze a temperature variation of the work environment around the cell 11 according to the temperature value recorded in the detection parameters, take the analysis result as an operating process when the temperature variations shown as being large, and select a SOC estimation method capable of providing temperature compensation to calculate the SOC.

The micro-processing unit 130 analyzes from the charging/discharging state in the detection parameters to realize the state of the cells having performed several times of charging and discharging actions. Thereafter, the micro-processing unit 130 does not select the ampere-our method to calculate the SOC because of this as-known operating process. In other words, the micro-processing unit 130 determines the use state as the operating process of the cell 11 according to the detection parameters generated from the detection module 120. Based on the determined operating process, a proper SOC estimation method is selected.

The charging balancing module 140 adjusts a charging current and a charging time of each of the cells 11 according to the calculated SOC of the cells 11, respectively, by the micro-processing unit 130 to enable the cells 11 to maintain charging balanced, respectively. In real implementation, the charging balancing module 140 may use several switch elements, such as transistors, to form a switch array. As such, the electric connection manner among the cells 11 may be controlled to present an active balancing or passive balancing. Since the technology of adjusting a charging current and a charging time is conventionally used, and will be omitted here.

It is to be particularly noted that the system may further comprise a weighting module 150 to pre-store a weighting value corresponding to each of the SOC estimation methods. For example, the ampere-hour has a weighting value of "1", the Coulomb counting method "10", the inner-resistance "5", and the voltage look-up table method "2", which may all be set by a user, for example, according to the accuracy of the SOC estimation method, e.g. the more accurate the estimation method is, the higher value the weighting value is. As such, when the micro-processing unit 130 selects more than one SOC estimation methods simultaneously, these weighting values corresponding thereto may be provided to the micro-processing unit 130 for adjustment in the calculation task of the SOC of the cell 11. For example, assume four estimation methods are selected at the same time for calculation of the SOC of each of the cell 11 as "5 Ah", "6 Ah" "8 Ah" and "10

Ah", respectively. When the weighting values are "10", "3", "2", and "1", respectively, the micro-processing unit 130 adjusts the residual resistance value according to the weighting values into "6 Ah" by the calculation of "(5*10+6*3+ 8*2+10*1)/(10+3+2+1)". It is to be particularly pointed out that although the above calculation is selected for the use of the weighting values, other calculations are also possible. Any calculation capable of adjusting the calculated SOC by using the weighting values is deemed as within the scope of the present invention.

Figure 2:
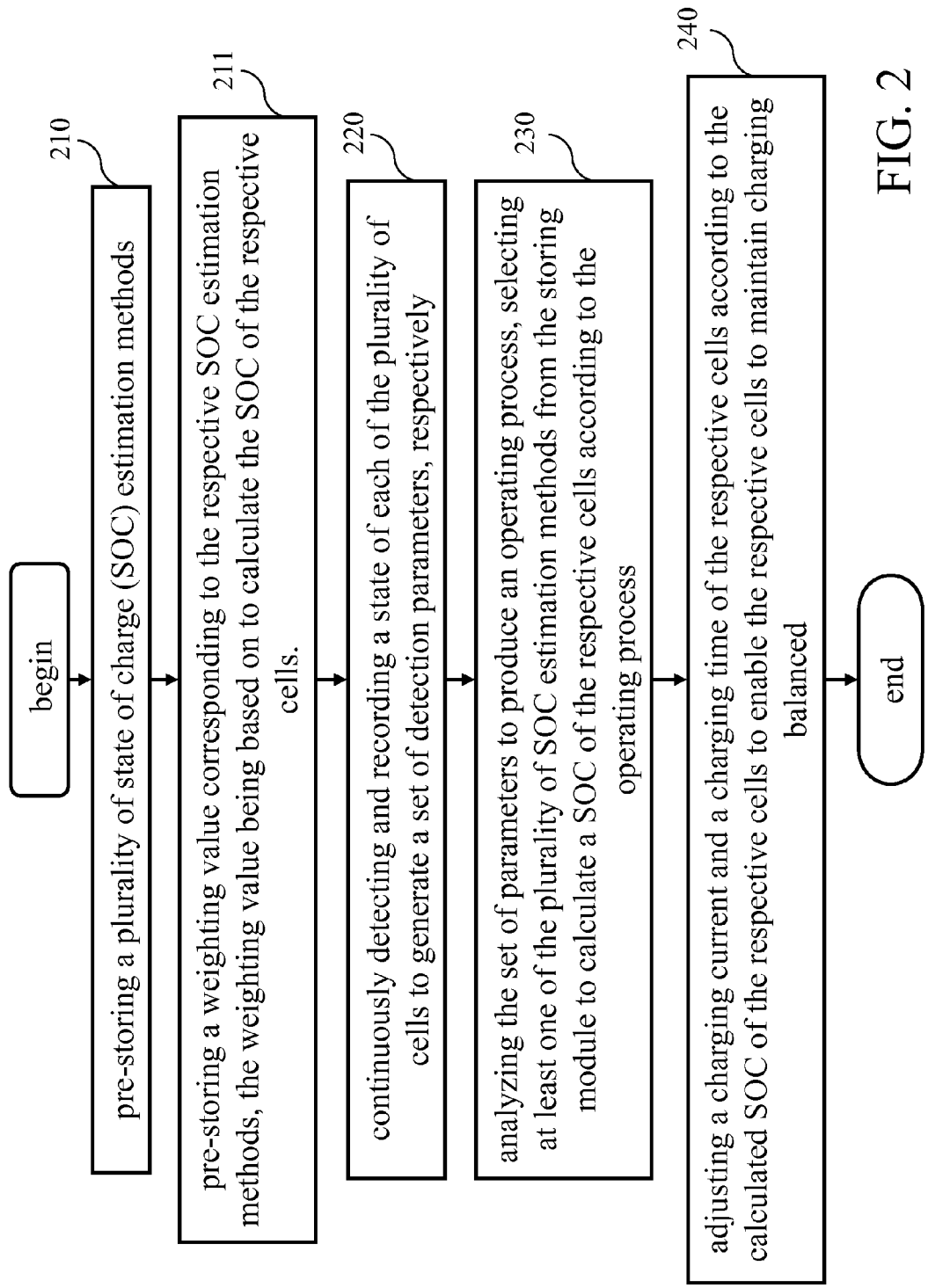
FIG. 2 is a process flowchart depicting a charging balancing method based on a battery operating process according to the present invention.

Next, referring to FIG. 2, in which a process flowchart depicting a charging balancing method based on a battery operating process according to the present invention is shown. This method comprises the following steps. First, a plurality of SOC estimation methods are pre-stored (Step 210). Next, a state of each of the plurality of cells 11 is continuously detected and recorded to generate a set of detection parameters, respectively (Step 220). The set of parameters is analyzed to produce an operating process, and at least one of the plurality of SOC estimation methods is selected from the storing module to calculate a SOC of the cells 11 according to the operating process, respectively (Step 230). Finally, a charging current and a charging time of the respective cells are adjusted according to the calculated SOC of the cells 11 to enable the cells 11 to maintain balanced, respectively (Step 240). Through the steps above, the states of all the cells 11 in the battery assembly 10 are detected to generate detection parameters. Then, the detection parameters are analyzed to produce an operating process, the operating process is relied on to select at least one SOC estimation method to calculate the SOC of each of the cells 11, and the residual electric quantities obtained are each used to adjust the charging current and charging time of the corresponding cells 11, respectively In real implementation, the step 220 may further comprise a step of pre-storing some weighting values each corresponding to one of the SOC estimation methods to adjust the calculation for the SOC of each of the cells 11 (Step 211). Since the calculation of the SOC by using the weighting value has been described above, and thus omitted here.

Figure 3:
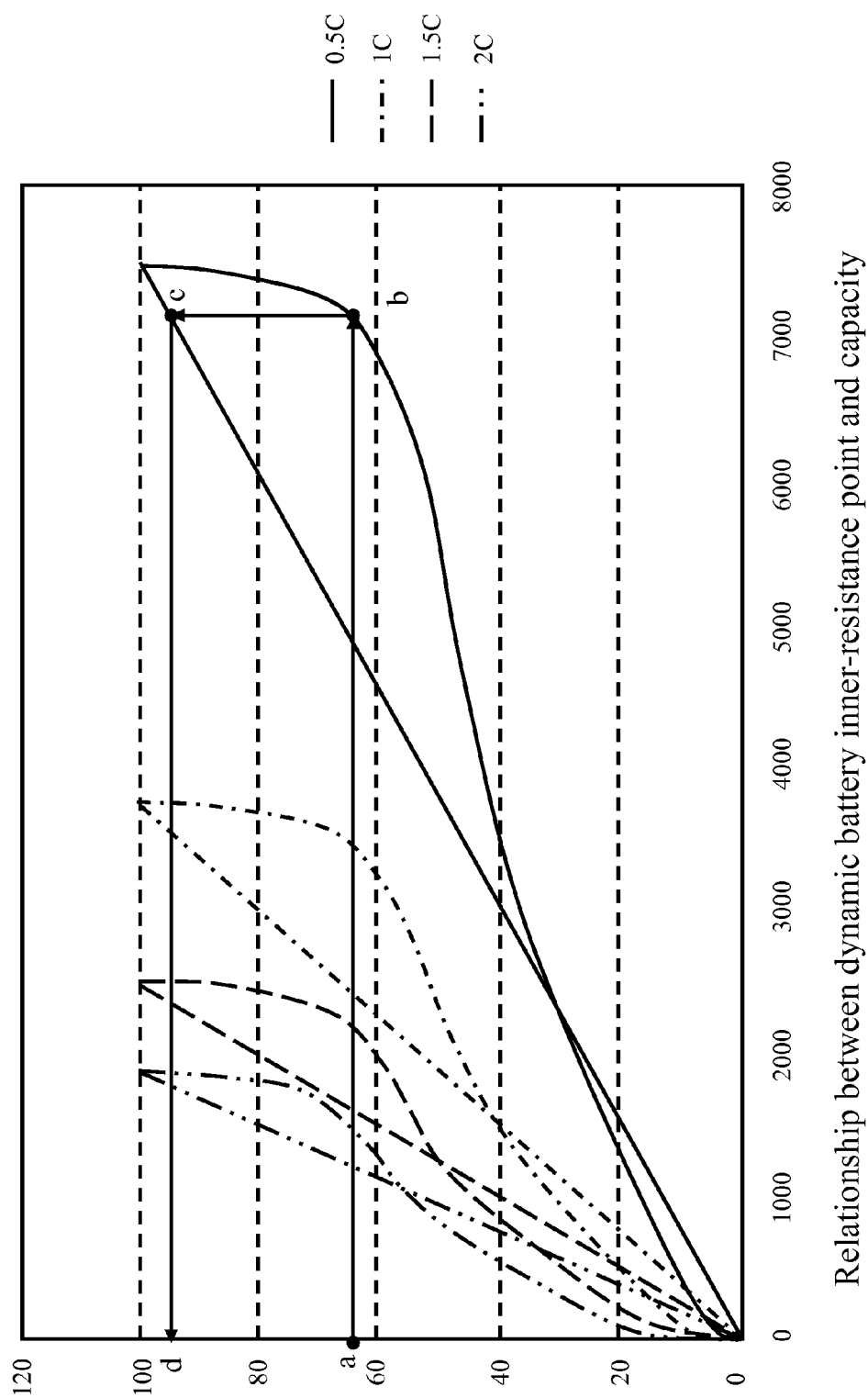
FIG. 3 is a schematic diagram for depicting how a vector state of charge (SOC) estimation method produces a partial amount of a dynamic battery inner-resistance electric capacity according to the present invention.

In the following, description of the present invention will be continued with reference to FIG. 3 through FIG. 6 in the form of embodiments. Referring to FIG. 3, a schematic diagram for depicting how a vector SOC estimation method produces a component of a dynamic battery inner-resistance electric capacity according to the present invention. As mentioned earlier, the storing module 110 may also store a SOC estimation method designed by this application, such as vector SOC, as compared to the prior SOC estimation method.

Now take the vector SOC as an example, it continuously detects each of the cells 11 to obtain detection parameters for calculation of a dynamic battery inner-resistance point, and determines an electric capacity variation by referring to a preset look-up table, in which a relationship between such dynamic battery inner-resistance point and the electric capacity variation is presented as a pair and recorded. Subsequently, similarly after a component of a battery Coulomb counting electric capacity is calculated by the Coulomb counting method according to the detection parameters, the component of the dynamic battery inner-resistance electric capacity and the component of the battery Coulomb counting electric capacity are added up to calculate the SOC of each of the cells 11. Till now, the vector SOC estimation method is finished. Just like other SOC estimation methods, any parameters and messages required to be used by the vector SOC estimation method are also pre-stored in the storing module 110, such as electric capacity variation look-up table, reference voltage value, amplification parameter, and in-series cell number.

In real implementation, when the micro-processing unit 130 selects the vector SOC estimation method according to the operating process, it also calculates the dynamic battery inner-resistance point via of the dynamic battery inner-resistance point privately defined in the above, and locates from the look-up table dynamic battery inner-resistance electric capacity corresponding to the dynamic battery inner-resistance point according to the preset electric capacity variation. The mentioned electric capacity look-up table is a table describing a relationship between different discharging currents of different batteries and capacity variations each presenting as a pair with the corresponding one of the discharging currents. For example, the look-up table is a table having a relationship between the discharging currents 0.5 C, 1 C, 1.5 C, 2 C, ..., until to a maximum rating discharging current for the battery and their corresponding capacities, respectively. For the pitch of the discharging current range in the look-up table, 0.25 C may be selected, i.e. the discharging currents provided in the look-up table are 0.25 C, 0.5 C, 0.75 C, ..., until to the maximum rating discharging current for the battery, respectively. Or, other pitches forming the discharging currents in the look-up table as an equal series may also be used.

To facilitate description, the data recorded in the electric capacity look-up table comes up as various kinds of stripes schematically shown in FIG. 3, i.e. relationships between the dynamic battery inner-resistance pointes and the corresponding capacities when different discharging currents are used at a time frame from electric saturation to electric capacity exhaust. In the figure, the slanting portions are capacity and the curve portions are each the corresponding dynamic battery inner-resistance point, and from left to right, the discharging currents are 2 C, 1.5 C, 1 C, and 0.5 C, respectively. As also mentioned earlier, the dynamic battery inner-resistance point may be deduced by using the calculation associated with the dynamic battery inner-resistance point. In real implementation, assume the discharging current is 0.5 C, and the dynamic battery inner-resistance point is calculated as point "a" in FIG. 3, then point "a" corresponds to the measured discharging current amount, i.e. 0.5 C. At this time, the dynamic battery inner-resistance point "b" and the capacity may be found from the electric capacity variation stored in the storing module 110. The found discharging capacity is set as a value of "c". Then, a percentage "d" of the current used capacity to the original total capacity is calculated through the total discharging capacity ("c"/0.5 C). This percentage is right a component in the vertical direction, i.e. dynamic battery inner-resistance electric capacity. Till now, generation of a component of the dynamic battery inner-resistance electric capacity may be finished through the electric capacity variation look-up table.

It is to be particularly noted that although only four sets of the relationship between the dynamic battery inner-resistance point and capacity are recorded in the electric capacity variation look-up table in FIG. 3, the present invention is not limited thereto. In real implementation, the electric capacity variation look-up table may also store more sets of relationship between the dynamic battery inner-resistance point and the capacity, when the discharging currents are different, such as 1.3 C, 1.4 C, and so on. In addition, in real implementation, by setting the parameters "α" and "β" the dynamic battery inner-resistance point is controlled within a range between "0" and "100" to correspond to the longitudinal axis in FIG. 3.

Figure 4A:
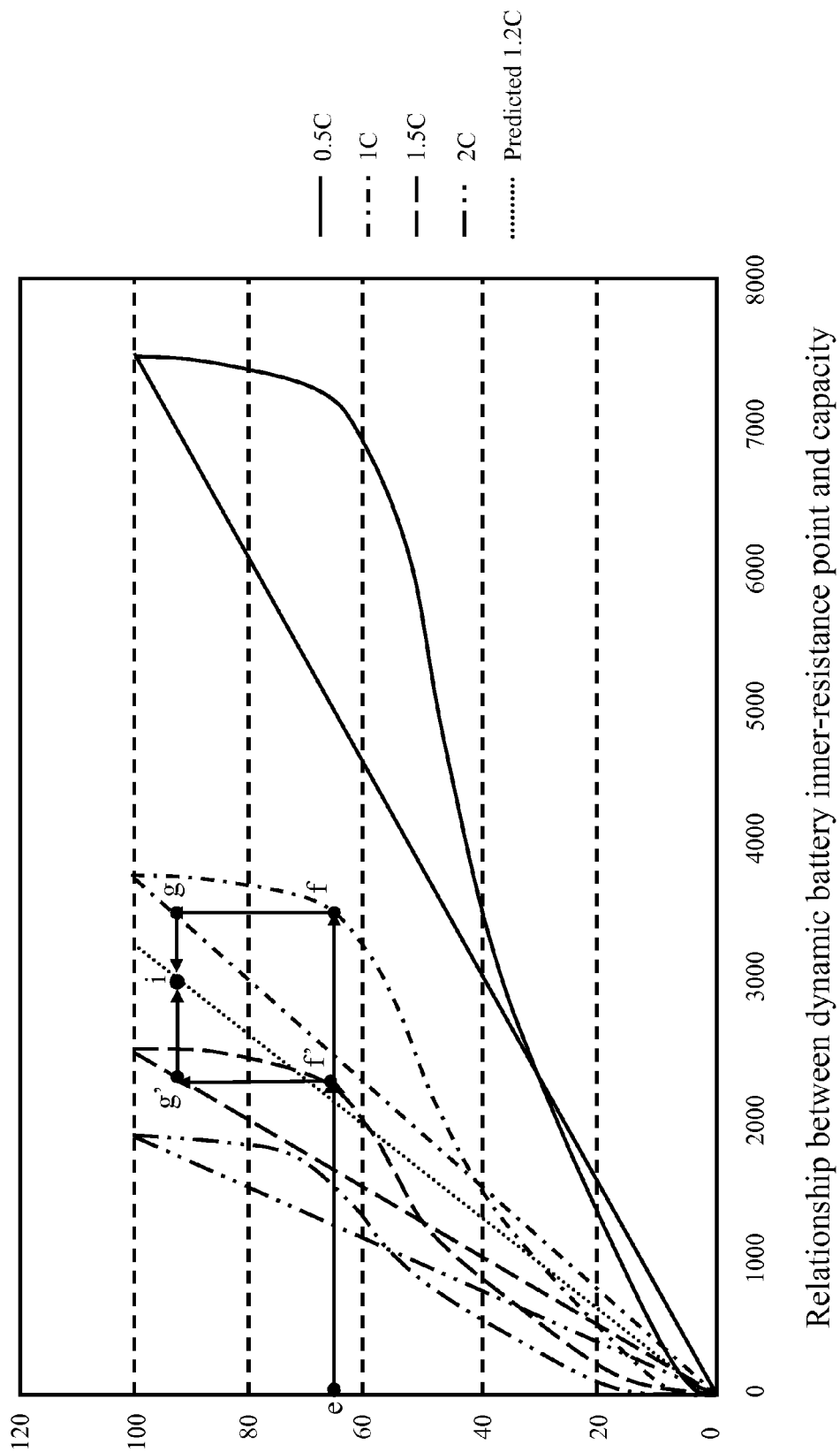
FIG. 4A and FIG. 4B are a schematic diagram depicting a weighting process based on a discharging C-rate before and after using the vector SOC according to the present invention, respectively.
Figure 4B:
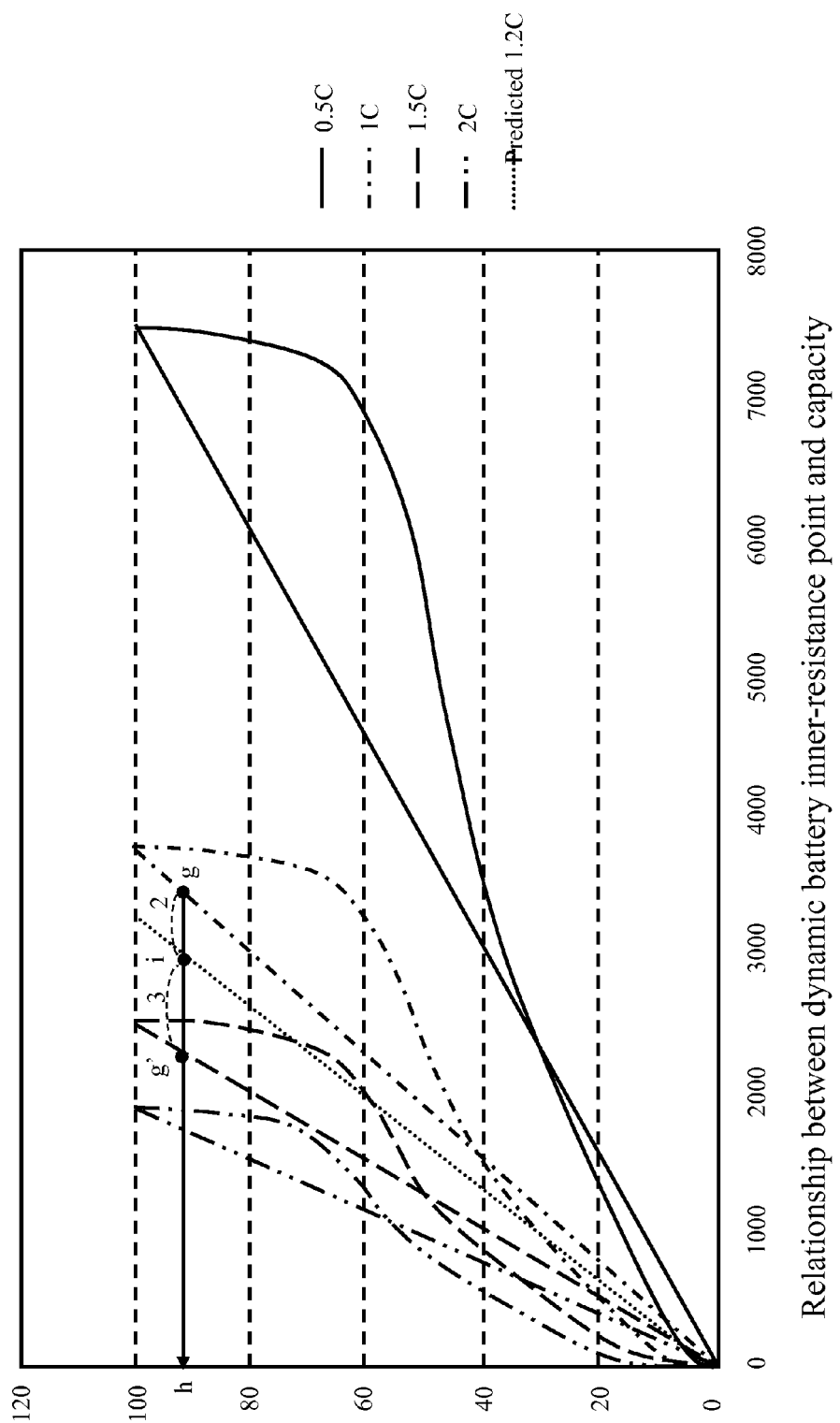

Referring to FIG. 4A and FIG. 4B, which are schematic diagrams depicting a weighting process based on a discharging C-rate before and after using the vector SOC according to the present invention, respectively. As afro-mentioned, the storing module 110 pre-stores electric capacity look-up table, in which a relationship between dynamic battery inner-resistance point and the electric capacity variation corresponding thereto for different discharging C-rate cases, are recorded, respectively. However, there is also the case where no corresponding result for a given discharging C-rate exists in the electric capacity variation look-up table. At this time, a discharging C-rate prior to or posterior to the given discharging C-rate in the electric capacity variation look-up table are together subject to a weighting process. For example, assume the dynamic battery inner-resistance point is calculated as "65", corresponding to point "e" in FIG. 4A. When the discharging C-rate is detected as 1.2 C, and the relationship between the dynamic battery inner-resistance point and the capacity for this case does not exist in the electric capacity variation look-up table, a pitch from 1.2 C to a previous and succeeding discharging C-rate is calculated, respectively. Namely, the dynamic battery inner-resistance point "65" is determined as having a mapping with respect to 1 C of point "f" and 1.5 C of point "f'", respectively. And, the discharging capacities of point "g" and point "g'" corresponding thereto are found from the look-up table, respectively.

Thereafter, as shown in FIG. 4B, there is a distance of 0.2 between the discharging capacity point "i" of 1.2 C and the discharging capacity point "g" of 1 C. And, there is a distance of 0.3 between the discharging capacity point "i" of 1.2 C and the discharging capacity point "g'" of 1.5 C, forming a 2:3 proportional relationship. At this time, the capacity percentage for the case of 1.2 C is "(3*dynamic battery inner-resistance point "65" and the found capacity in the case of 1 C discharging+2*dynamic battery inner-resistance point "65" and the found capacity in the case of 1.5 C discharging)/(2+3)". Thus, the dynamic battery inner-resistance point is deduced as "65", and the corresponding capacity percentage is point "h", which is a component in the vertical direction in the case of 1.2 C discharging, i.e. the component of the dynamic battery inner-resistance electric capacity. Therefore, when the discharging C-rate has no its relationship between the dynamic battery inner-resistance point and the capacity existing in the electric capacity variation look-up table, the component of the corresponding dynamic battery inner-resistance electric capacity still can be deduced by the weighting process described above.

Figure 5:
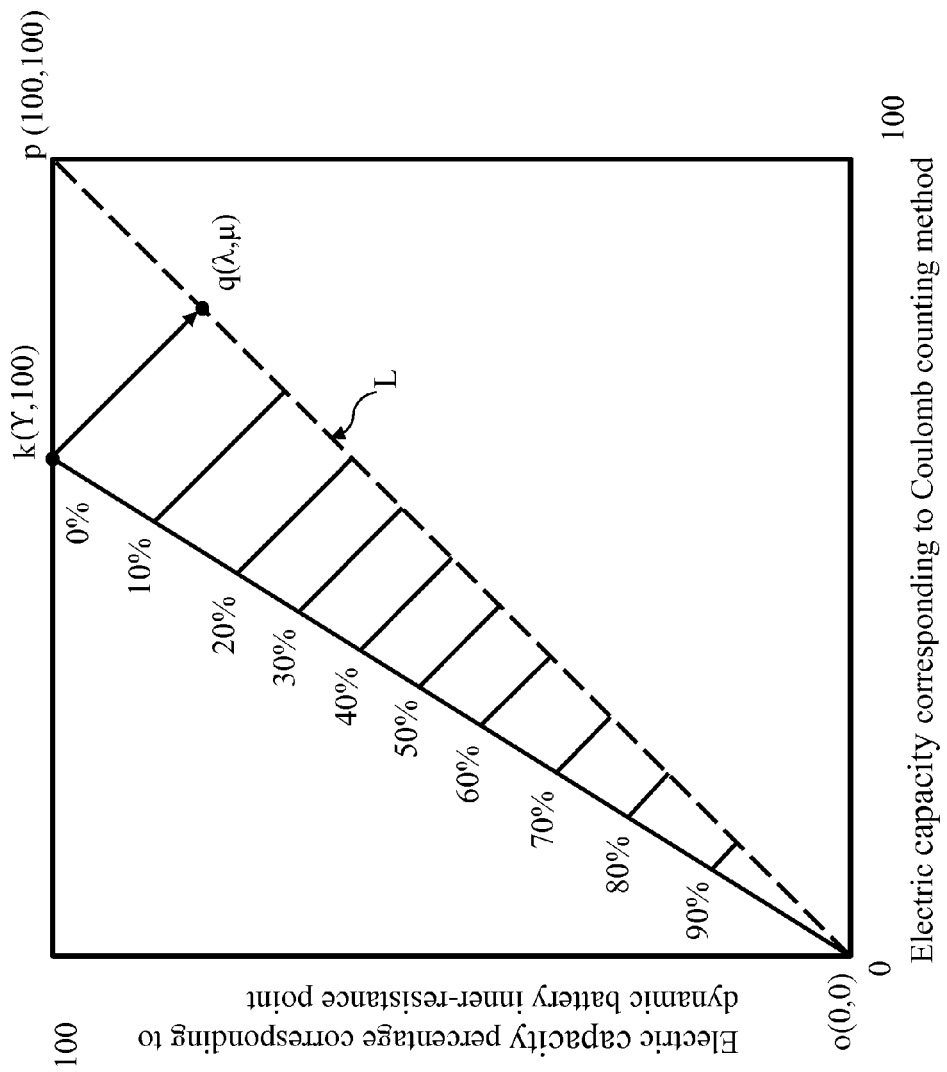
FIG. 5 is a schematic diagram depicting how the vector SOC estimation method defines a percentage of a SOC of a battery according to the present invention.

Subsequently, referring to FIG. 5, which is a schematic diagram depicting how the vector SOC estimation method defines a percentage of a SOC of a battery according to the present invention. In this figure, the horizontal axis is electric capacity percentage which corresponds to the battery Coulomb counting method, which may be calculated by the calculation of "$Q(t)=Q_0+\int_{t_0}^{t}idt$)", wherein "$Q_0$" is an initial electric capacity before the discharging action calculated with the aid of the electric capacity variation look-up table, and during the discharging process the current "i" is negative. The thus-obtained "Q(t)" at time "t" is divided by a full charging capacity "$Q_{Full}$" to obtain a capacity percentage "j" and point "j" may be served as a component along the horizontal direction, i.e. the component of the battery Coulomb counting electric capacity. Since the Coulomb counting method and the component conversion operation have been known in the prior art, they are omitted for explanation here. As for the longitudinal axis, it is electric capacity percentage having a corresponding relationship with dynamic battery inner-resistance point. In FIG. 5, a point "k" (Y, 100) may be found according to a relationship between the maximum battery rating dischargeable current and capacity (since the Coulomb counting method may have an error as compared to an exact consumed energy owing to the battery's generation of heat, the position "100" cannot be exactly reached along the horizontal direction, while the position "100" along the vertical direction can absolutely be reached, since the dynamic battery inner-resistance point uses a voltage difference, making the position obtained by deducting a lowest cut-off voltage from a reference voltage absolutely reached). Then, a projection of point "k" on a straight trace L is conducted. Take a direct projective "$\vec{ok}$" of "$\vec{oq}$" on "$\vec{op}$" for an example, it is calculated as the following equation:

$$\text{"}\vec{oq} = (|\vec{oq}| \times \cos\theta)\frac{\vec{op}}{|\vec{op}|} = \frac{\vec{oq}\cdot\vec{op}}{|\vec{op}|^2}\text{"},$$

and point "q" is obtained with its coordination ($\lambda$, $\mu$).

Then, a line fragmentation "$\vec{oq}$" formed from point q ($\lambda$, $\mu$) and the original point o (0,0) is divided into "n" equal portions, wherein "n" is a positive integer, and may be given according to real requirement and demanded accuracy. In FIG. 5, "n" is a number "100", which means "100" equal portions, meaning a residual amount estimation of 100% to 0%, and an accuracy error of 1%. Each of such equal portions represents a number value represented by the SOC.

Figure 6:
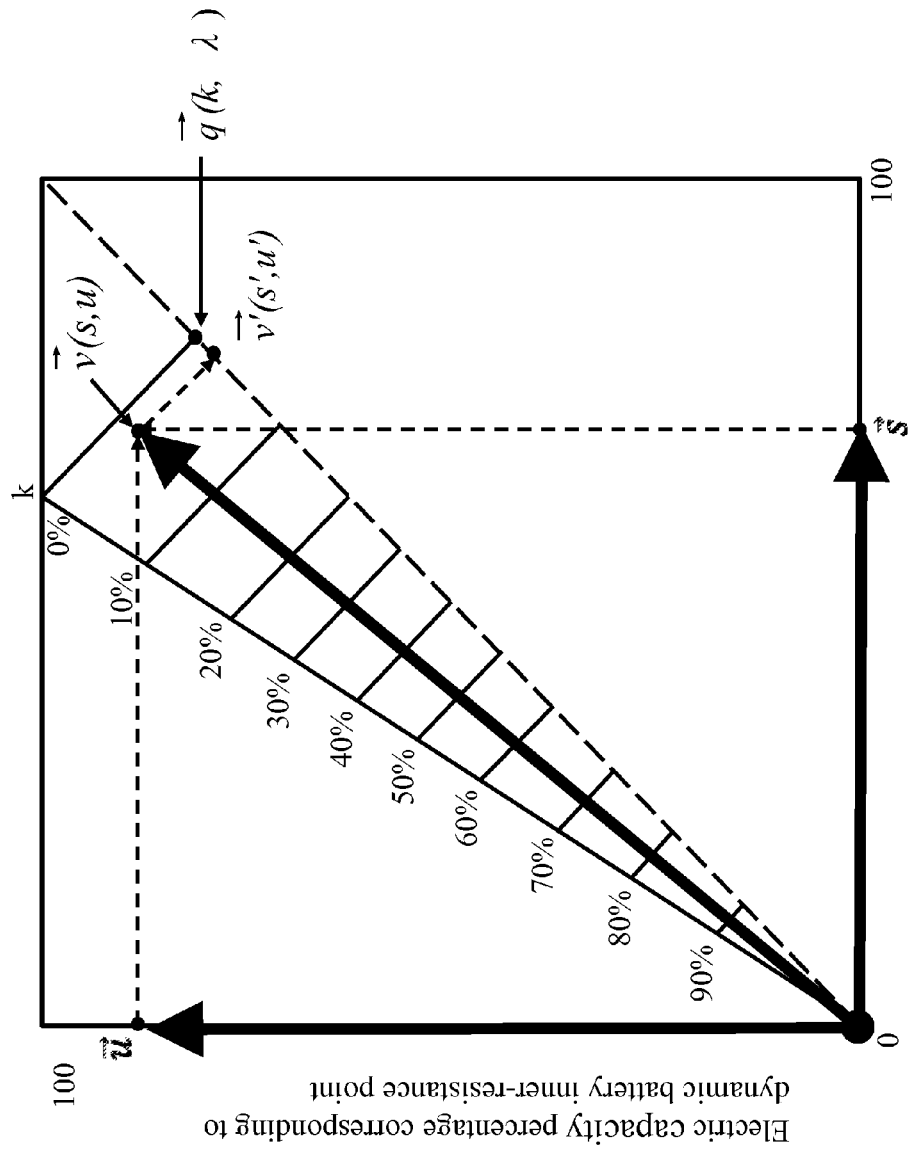
FIG. 6 is a schematic diagram depicting how the vector SOC estimation defines a percentage of a SOC of a battery according to the present invention.

Refer to FIG. 6, is a schematic diagram depicting how the vector SOC estimation defines a percentage of a SOC of a battery according to the present invention. Assume at time "t", the electric capacity percentage "$\vec{u}$" calculated from the dynamic battery inner-resistance point, i.e. the component of the dynamic battery inner-resistance electric capacity, is deduced, and the electric capacity percentage "$\vec{s}$" calculated by the Coulomb counting method, i.e. the component of the battery Coulomb counting electric capacity, is deduced. The vector "$\vec{v}$(s,u)" defined by components "$\vec{u}$" and "$\vec{s}$" is projected on straight trace "k" to obtain "$\vec{v}$(s',u')", which is subsequently compared with a maximum battery displayable capacity, point "$\vec{q}$". The percentage of the SOC associated with "$\vec{v}$(s',u')" is calculated as follows:

$$SOC\,\% = \frac{\sqrt{s'^2 + u'^2}}{\sqrt{k^2 + \lambda^2}}.$$

By means of the above calculation, SOC at time "t" is deduced. As such, both the longitudinal axis (vertical direction) and horizontal axis (horizontal direction) are corrected to obtain a SOC which is truly usable of each of the cells 11, instead of the conventional way where only one axis is calculated. In other word, the component of the dynamic battery inner-resistance electric capacity "$\vec{V}$" and the component of the Coulomb counting electric capacity "$\vec{C}$" are added up to calculate the SOC really usable in the cell 11, in which the calculation may be represented as "$\vec{SOC}=\vec{V}+\vec{C}$". Since the vector operation has been conventionally known, it is omitted here. After the SOC which may be truly used is calculated by the vector SOC estimation method, the charging balancing module 140 may maintain charging balanced according to the SOC which may be truly used in each of the cells 11.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A charging balancing system based on a battery operating process applied onto a battery assembly having a plurality of cells, comprising:
    a storing module, pre-storing a plurality of state of charge (SOC) estimation methods;
    a detecting module, continuously detecting and recording a state of each of the plurality of cells to generate a set of detection parameters, respectively;
    a micro-processing unit, analyzing the set of parameters to produce an operating process, selecting at least one of the plurality of SOC estimation methods from the storing module to calculate a SOC of the respective cells according to the operating process; and
    a charging balancing module, adjusting a charging current and a charging time of the respective cells according to the calculated SOC of the respective cells to enable the respective cells to maintain charging balanced.

2. The charging balancing system as claimed in claim 1, further comprising a weighting module, pre-storing a weighting value corresponding to the respective SOC estimation methods, and the weighting value is based on to calculate the SOC of the respective cells by the micro-processing unit.

3. The charging balancing system as claimed in claim 1, wherein the plurality of SOC estimation methods include an ampere-hour method, a Coulomb counting method, an inner-resistance method, a voltage look-up table method, and a vector SOC estimation method.

4. The charging balancing system as claimed in claim 3, wherein the vector SOC estimation method calculates the SOC of the respective cells by continuously calculating a dynamic battery inner-resistance index according to the set of detection parameters by looking up from an electric capacity variation look-up table to produce a component of a dynamic battery inner-resistance electric capacity, producing a component of a battery Coulomb counting electric capacity according to the set of detection parameters, and summing the component of the dynamic battery inner-resistance electric capacity and the component of the battery Coulomb counting electric capacity to calculate the SOC of the respective cells.

5. The charging balancing system as claimed in claim 4, wherein the electric capacity variation look-up table includes a relationship between the dynamic battery inner-resistance index and a capacity of at least a discharging current amount.

6. A charging balancing method based on a battery operating process applied onto a battery assembly having a plurality of cells, comprising steps of:
    pre-storing a plurality of state of charge (SOC) estimation methods;
    continuously detecting and recording a state of each of the plurality of cells to generate a set of detection parameters, respectively;
    analyzing the set of parameters to produce an operating process, selecting at least one of the plurality of SOC estimation methods from the storing module to calculate a SOC of the respective cells according to the operating process; and
    adjusting a charging current and a charging time of the respective cells according to the calculated SOC of the respective cells to enable the respective cells to maintain charging balanced.

7. The charging balancing method as claimed in claim 6, further comprising a step of pre-storing a weighting value corresponding to the respective SOC estimation methods, the weighting value being based on to calculate the SOC of the respective cells.

8. The charging balancing method as claimed in claim 6, wherein the set of detection parameters is selected from a group consisting of a close circuit voltage value, a close circuit current value, a discharging current amount, a temperature, a charging/discharging number, and a discharging depth of the respective cell.

9. The charging balancing method as claimed in claim 6, wherein the plurality of SOC estimation methods include an ampere-hour method, a Coulomb counting method, an inner-resistance method, a voltage look-up table method, and a vector SOC estimation method.

10. The charging balancing method as claimed in claim 9, wherein the vector SOC estimation method calculates the SOC of the respective cells by continuously calculating a dynamic battery inner-resistance point according to the set of detection parameters by looking up from an electric capacity variation look-up table to produce a component of a dynamic battery inner-resistance electric capacity, producing a component of a battery Coulomb counting electric capacity according to the set of detection parameters, and summing the component of the dynamic battery inner-resistance electric capacity and the component of the battery Coulomb counting electric capacity to calculate the SOC of the respective cells, respectively.

11. The charging balancing method as claimed in claim 10, wherein the electric capacity variation look-up table includes a relationship between the dynamic battery inner-resistance point and a capacity of at least a discharging current amount.

* * * * *